(12) United States Patent
Rangel de Oliveira, Jr. et al.

(10) Patent No.: US 11,965,093 B2
(45) Date of Patent: Apr. 23, 2024

(54) POLYAMIDE COMPOSITION

(71) Applicant: BASF SE, Ludwigshafen am Rhein (DE)

(72) Inventors: Adair Rangel de Oliveira, Jr., Santo Andre (BR); Fabiana Zanelato Kuwajima, Santo Andre (BR); Antonio Cesar Da Silva, Santo Andre (BR); Carolina Teixeira, Sao Paulo (BR)

(73) Assignee: BASF SE, Ludwigshafen am Rhein (DE)

( * ) Notice: Subject to any disclaimer, the term of this patent is extended or adjusted under 35 U.S.C. 154(b) by 408 days.

(21) Appl. No.: 17/311,042

(22) PCT Filed: Dec. 6, 2019

(86) PCT No.: PCT/EP2019/084017
§ 371 (c)(1),
(2) Date: Jun. 4, 2021

(87) PCT Pub. No.: WO2020/115292
PCT Pub. Date: Jun. 11, 2020

(65) Prior Publication Data
US 2022/0025178 A1 Jan. 27, 2022

(30) Foreign Application Priority Data
Dec. 6, 2018 (EP) ..................... 18306626

(51) Int. Cl.
*C08L 77/06* (2006.01)
*C08G 69/26* (2006.01)
*C08K 3/16* (2006.01)
*C08K 7/14* (2006.01)

(52) U.S. Cl.
CPC .............. *C08L 77/06* (2013.01); *C08G 69/26* (2013.01); *C08K 3/16* (2013.01); *C08K 7/14* (2013.01); *C08L 2201/08* (2013.01); *C08L 2203/30* (2013.01); *C08L 2205/025* (2013.01)

(58) Field of Classification Search
CPC ........... C08L 2205/025; C08L 2201/08; C08L 2666/54; C08L 2666/72; C08L 77/06; C08G 69/265
See application file for complete search history.

(56) References Cited

U.S. PATENT DOCUMENTS

2013/0281589 A1 10/2013 Thompson et al.
2016/0168381 A1 6/2016 Washio et al.

FOREIGN PATENT DOCUMENTS

CN 102952391 A 3/2013
WO 2017191269 A1 11/2017

OTHER PUBLICATIONS

International Search Report and Written Opinion for corresponding International Application No. PCT/EP2019/084017, dated Feb. 12, 2020, 10 pages.

*Primary Examiner* — Ana L. Woodward
(74) *Attorney, Agent, or Firm* — Armstrong Teasdale LLP

(57) ABSTRACT

Described herein is a polyamide composition including:
(a) at least one first semi-crystalline polyamide including repeating units derived from two or more diacids, and one or more diamine(s),
(b) at least one second semi-crystalline polyamide including repeating units derived from two or more diacids and one or more diamine(s),
(c) at least one glass fibre, and
(d) optionally at least one further additive,
wherein the at least one first semi-crystalline polyamide and the at least one second semi-crystalline polyamide are different from each other and defined by their molar ratio of repeating units derived from aromatic dicarboxylic acids and aliphatic dicarboxylic acids. As described herein, the polyamide composition provides a superior combination of high thermal stability (i.e. heat distortion temperature) and high flowability (i.e. low melt viscosity).

19 Claims, No Drawings

POLYAMIDE COMPOSITION

CROSS-REFERENCE TO RELATED APPLICATIONS

This application is a U.S. National Phase Application of International Patent Application No. PCT/EP2019/084017, filed Dec. 6, 2019, which claims the benefit of priority to European Patent Application No. 18306626.5, filed Dec. 6, 2018, the entire contents of which are hereby incorporated by reference herein.

The present invention relates to polyamide compositions comprising at least two different polyamides and at least one glass fibre, which provide a superior combination of high dimensional stability vs temperature (i.e. heat distortion temperature) and high flowability (i.e. low melt viscosity).

BACKGROUND OF THE INVENTION

Polyamide compositions are frequently used for technical construction materials since they exhibit good toughness, rigidity and heat resistance, i.e. high performance retention of mechanical properties such as tensile strength at break and Charpy impact strength, high heat distortion temperature (HDT) and minimum distortion during injection molding. Areas of application of these polyamide compositions include, for example, interior and exterior parts in the automotive sector and in the area of other transport means, housing materials for appliances and equipment for telecommunications, entertainment electronics, household appliances, mechanical engineering equipment, equipment in the heating field and fasting parts for installations.

In order to exhibit the excellent mechanical properties, i.e. high rigidity and excellent toughness in addition to good heat resistance, polyamide compositions typically comprise reinforcing fillers, such as glass fibres (GF) in addition to the polyamide resins.

However, reinforced polyamide compositions having high thermal stability (i.e. high heat distortion temperatures) typically exhibit high melt viscosities and therefore have low melt flow rates. Thus, reinforced polyamide compositions having high thermal stability are difficult to be processed and require high processing temperatures.

CN102952391 relates to a flame-retardant polyamide composition, which basically does not contain nitrogen-containing compounds. The composition basically consists of the following components: (a) at least one aromatic polyamide; (b) about 5-30 wt.-% of at least one halogen-free flame retardant; (c) about 0.1-10 wt.-% of mica sheets; and optionally (d) up to about 45 wt.-% of at least one reinforcing agent, which is selected from a glass fibre, a glass sheet and their combination. The total weight percentage of all components of the composition is 100 weight %. The at least one aromatic polyamide may be selected from the group consisting of polyamide 66/6T, polyamide 6T/66, polyamide 6T/DT, polyamide 6I/6T, polyamide 9T, polyamide 10T, polyamide 12T, and combinations of two or more of the above.

US 2013/0281589 discloses a thermoplastic polyamide composition including a) a polyamide resin; b) one or more polyhydric alcohols; c) one or more anti-whitening agents selected from the group consisting of poly(ethylene glycol), poly(ethylene glycol) diesters, poly(propylene glycol), poly (propylene glycol) diesters; and styrene-isoprene-styrene block copolymers; and mixtures of these; d) a lubricant; e) one or more reinforcement agents; and, optionally, f) a polymeric toughener comprising a reactive functional group and/or a metal salt of a carboxylic acid. The polyamide composition can contain blends of two or more polyamides.

US 2016/168381 discloses a semi-aromatic polyamide resin composition containing specific proportions of (A) a semi-aromatic polyamide comprising a dicarboxylic acid component comprising terephthalic acid and adipic acid and a diamine component having a linear aliphatic diamine having 4-10 carbon atoms, (B) a semi-aromatic polyamide comprising a dicarboxylic acid component having isophthalic acid and a diamine component having an aliphatic diamine having 4-15 carbon atoms, (C) an olefin polymer containing a specific amount of functional group structural units, and (D) a fibrous filler.

SUMMARY OF THE INVENTION

The invention relates to a polyamide composition comprising (or consisting of):
(a) at least one first semi-crystalline polyamide comprising repeating units derived from two or more diacids and one or more diamine(s), containing:
  (i) ≥20 to <40 mol.-% of at least one aromatic diacid, based on the total amount of moles of diacid(s) present in the first polyamide,
  (ii) >60 to ≤80 mol.-% of at least one aliphatic diacid, based on the total amount of moles of diacid(s) present in the first polyamide,
(b) at least one second semi-crystalline polyamide comprising repeating units derived from two or more diacids and one or more diamine(s), containing:
  (i) ≥40 to ≤90 mol.-% of at least one aromatic diacid, based on the total amount of moles of diacid(s) present in the second polyamide,
  (ii) ≥10 to ≤60 mol.-% of at least one aliphatic diacid, based on the total amount of moles of diacid(s) present in the second polyamide,
(c) at least one glass fibre, and
(d) optionally at least one further additive.

It was surprisingly found by the present inventors that by combining a first semi-crystalline polyamide comprising a low molar amount of repeating units derived from aromatic diacids with a second semi-aromatic polyamide comprising a higher amount of repeating units derived from aromatic diacids and at least one glass fibre, a polyamide composition may obtained which is characterized by having a high dimensional stability vs temperature (i.e. high heat distortion temperature) and a good processability (i.e. low melt viscosity). The polyamide composition according to the present invention provides a superior combination of high dimensional stability vs temperature (i.e. heat distortion temperature) and high flowability (i.e. low melt viscosity). Moreover, the polyamide compositions of the present invention impart further advantageous properties such as low water absorption and high mechanical resistance. This unique combination of properties allows the preparation of molded parts with reduced processing cycle times and low processing temperature. At the same time, the molded parts have superior mechanical properties.

It was found by the present inventors that the combination of the first semi-crystalline polyamide and the second semi-crystalline polyamide according to the invention results in a synergistic effect which provides the unique combination of properties described herein. Without being bound to the theory, it is believed that this synergistic effect is achieved by induced nucleation and crystallization processes of the first semi-crystalline polyamide over the second semi-crystalline polyamide and vice versa, thus increasing the crystallinity level of the polyamide composition.

DETAILED DESCRIPTION OF THE INVENTION

In the present document, the following definitions apply:

In general, polyamides are to be understood as meaning polymers which are derived from dicarboxylic acids, diamines, aminocarboxylic acids and/or lactams. They may be homo- or copolymers. Furthermore, blends of homo- and/or copolymers are encompassed.

The meaning of the term "semi-crystalline polyamide" is known to a person skilled in the art. Usually, the term is intended to denote a polyamide comprising a crystallizable and an amorphous portion in the skeleton, i.e., an amorphous polymeric material which contains randomly entangled chains and a crystalline material which contains domains in which the polymer chains are packed in an ordered array, where these crystalline domains are embedded in an amorphous polymer matrix portion. In particular, the semi-crystalline polyamide in the solid state contains a fraction of regularly organized, crystalline polymeric domains in which polymer chains are packed in an ordered array (e.g. lamellae, spherulites). Crystalline domains coexist with a fraction of amorphous, non-crystallized polymer domains. The semi-crystalline fraction shows a melting and a crystallization point range, and a melting and a crystallization enthalpy as well. Such values can be easily detected by experts in the field, e.g. by DSC analysis or by X-ray diffraction. The amorphous phase does not show any melting or crystallization point.

As used herein, the singular forms "a", "an", and "the" include both singular and plural referents unless the context clearly dictates otherwise. By way of example, "an additive" means one additive or more than one additive.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used herein, the terms "% by weight", "wt.-%", "weight percentage", or "percentage by weight" are used interchangeably.

The phrase "repeating units derived from" refers to repeating units which are obtained from the indicated monomers by polymerization reaction as well as to repeating units which are derivable from those monomers but may also be obtained from other monomers.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

In the following passages, different alternatives, embodiments and variants of the invention are defined in more detail. Each alternative and embodiment so defined may be combined with any other alternative and embodiment, and this for each variant unless clearly indicated to the contrary or clearly incompatible when the value range of a same parameter is disjoined. In particular, any feature indicated as being preferred or advantageous may be combined with any other feature or features indicated as being preferred or advantageous.

Furthermore, the particular features, structures or characteristics described in present description may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

According to the present invention, the polyamide composition comprises at least on first semi-crystalline polyamide and at least one second semi-crystalline polyamide.

The at least on first semi-crystalline polyamide is preferably present in the polyamide composition in an amount of from 20 to 60 wt.-%, based on the total weight of the polyamide composition, preferably in an amount of from 22 to 50 wt.-%, in particular in an amount of from 25 to 40 wt.-%.

The at least one first semi-crystalline polyamide preferably has a melting temperature between 280° C. and 300° C., in particular between 285° C. and 295° C. Melting temperature is determined by differential scanning calorimetry (DSC) according to DIN EN ISO 11357.

The at least one first semi-crystalline polyamide preferably has a crystallization temperature ($T_{c1}$) between 245° C. and 260° C., in particular between 245° C. and 255° C. Crystallization temperature is determined by differential scanning calorimetry (DSC) according to DIN EN ISO 11357.

The at least one first semi-crystalline polyamide preferably has a melt viscosity between 30 Pa·s and 80 Pa·s, more preferably between 55 Pas and 65 Pas, measured under shear rate of 1/2500 s at 290° C. Melt viscosity is determined according to ISO 11443.

The at least one first semi-crystalline polyamide preferably comprises (or consists of) repeating units derived from two or more diacids and one or more diamine(s), containing:
 (i) ≥20 to <40 mol.-%, preferably ≥25 to ≤35 mol.-%, of at least one aromatic diacid, based on the total amount of moles of diacids present in the first polyamide,
 (ii) >60 to ≤80 mol.-%, preferably ≥65 to ≤75 mol.-%, of at least one aliphatic diacid, based on the total amount of moles of diacids present in the first polyamide.

In one embodiment of the invention, the at least one first semi-crystalline polyamide is made of one or more diacid(s) and one or more diamine(s), containing:
 (i) ≥20 to <40 mol.-%, preferably ≥25 to ≤35 mol.-%, of at least one aromatic diacid, based on the total amount of moles of diacids present in the first polyamide,
 (ii) >60 to ≤80 mol.-%, preferably ≥65 to ≤75 mol.-%, of at least one aliphatic diacid, based on the total amount of moles of diacids present in the first polyamide.

The at least on second semi-crystalline polyamide is preferably present in the polyamide composition in an amount of from 5 to 30 wt.-%, based on the total weight of the polyamide compositions, more preferably in an amount of from 10 to 25 wt.-%, and in particular in an amount of from 10 to 20 wt.-%.

The at least one second semi-crystalline polyamide preferably has a melting temperature of more than 290° C., in particular between 295 and 315° C. The melting temperature is determined by differential scanning calorimetry (DSC) according to DIN EN ISO 11357.

The at least one second semi-crystalline polyamide preferably has a crystallization temperature ($T_{c2}$) between 250° C. and 270° C., in particular between 255° C. and 265° C. The crystallization temperature is determined by differential scanning calorimetry (DSC) according to DIN EN ISO 11357.

The at least one second semi-crystalline polyamide preferably has a melt viscosity between 80 and 100 Pa·s, more preferably between 85 Pas and 95 Pa·s, measured under shear rate of 1/2500 s and 325° C. The melt viscosity is determined according to ISO 11443

The at least one second semi-crystalline polyamide preferably comprises (or consist of) repeating units derived from two or more diacids and one or more diamine(s), containing
(i) ≥40 to ≤90 mol.-%, preferably ≥50 to ≤80 mol.-%, of at least one aromatic diacid, based on the total amount of moles of diacids present in the second polyamide,
(ii) ≥10 to ≤60 mol.-%, preferably ≥20 to ≤50 mol.-%, of at least one aliphatic diacid, based on the total amount of moles of diacids present in the second polyamide, In one embodiment of the invention, the at least one second semi-crystalline polyamide is made of two or more diacids and one or more diamine(s), containing:
(i) ≥40 to ≤90 mol.-%, preferably ≥50 to ≤80 mol.-%, of at least one aromatic diacid, based on the total amount of moles of diacids present in the second polyamide,
(ii) ≥10 to ≤60 mol.-%, preferably ≥20 to ≤50 mol.-%, of at least one aliphatic diacid, based on the total amount of moles of diacids present in the second polyamide, In one embodiment of the invention, the at least one first semi-crystalline polyamide constitutes 5 to 94 wt.-%, preferably 60 to 86 wt.-% of the total weight of the at least one first semi-crystalline polyamide and the at least one second semi-crystalline polyamide.

The at least one first semi-crystalline polyamide is characterized by having a low melt viscosity. The melt viscosity is determined by the molecular weight obtained during polymerization, and also depends on the specific polymer composition, and particularly on the ratio of aromatic diacids and aliphatic diacids in the at least one first semi-crystalline polyamide.

According to the present invention, the first semi-crystalline polyamide and the at least one second polyamide are semi-aromatic polyamides.

The at least one second semi-crystalline polyamide is characterized by having a high melting temperature, and a higher heat distortion temperature than the first semi-crystalline polyamide. This is achieved by the specific ratio of aromatic diacids and aliphatic diacids in the at least one second semi-crystalline polyamide. Moreover the crystallization temperature ($T_{c2}$) of the second semi-crystalline polyamide is preferably higher than the crystallization temperature ($T_{c1}$) of the first semi crystalline polyamide.

The at least one first semi-crystalline polyamide and the at least one second semi-crystalline polyamide comprise repeating units derived from at least one aromatic diacid. The aromatic diacid(s) comprised in the at least one first semi-crystalline polyamide and the at least one second semi-crystalline polyamide can be the same or different from each other.

The at least one aromatic diacid are preferably selected from aromatic dicarboxylic acids commonly used in the preparation of polyamides. Preferred aromatic dicarboxylic acids include dicarboxylic acids of the general formula (I):

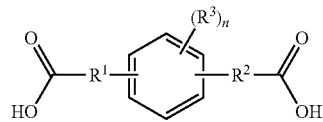

wherein
$R^1$ and $R^2$ each independently represent a single bond or an aliphatic or aromatic, saturated or unsaturated, linear, branched or cyclic hydrocarbon group having 1 to 20, preferably, 2 to 10, and in particular 3 to 6 carbon atoms;
$R^3$ represents a hydrogen atom, a hydroxyl group, a sulfoisophthalic acid group and salts thereof, or an aliphatic hydrocarbon group having 1 to 3 carbon atoms; and n represents an integer from 0 to 4.

In a preferred embodiment, $R^1$ and $R^2$ each represent a single bond and the carboxylic group is directly bonded to the aromatic ring.

In a further preferred embodiment $R^3$ represents a hydrogen atom, a hydroxyl group or a sulfoisophthalic salt, most preferably a hydrogen atom.

$R^1$ and $R^2$ may be positions in ortho-, meta-, or para-position to each other at the aromatic ring. It is particular preferred that the groups $R^1$ and $R^2$ are position meta- or para-position.

In a particular preferred embodiment, the at least one aromatic dicarboxylic acid is selected from terephthalic acid and isophthalic acid, both optionally substituted at the aromatic ring with a hydroxyl group. As a preferred example for such a substituted aromatic carboxylic diacid, 5-hydroxy isophthalic acid can be mentioned.

Most preferably, the at least one aromatic dicarboxylic acid is terephthalic acid.

The at least one first semi-crystalline polyamide and the at least one second semi-crystalline polyamide comprise repeating units derived from at least one aliphatic diacid. The aliphatic diacid(s) comprised in the at least one first semi-crystalline polyamide and the at least one second semi-crystalline polyamide can be the same or different from each other.

The at least one aromatic diacid is preferably selected from aliphatic dicarboxylic acids commonly used in the preparation of polyamides. Preferred aliphatic dicarboxylic acids include dicarboxylic acids of the general formula (II):

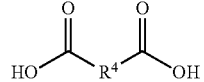

wherein
$R^4$ represents an aliphatic, saturated or unsaturated, linear or branched hydrocarbon group having 1 to 20, preferably, 2 to 10, and in particular 3 to 6 carbon atoms.

In a particular preferred embodiment, adipic acid is used as aliphatic dicarboxylic acid.

The at least one first semi-crystalline polyamide and the at least one second semi-crystalline polyamide further comprise repeating units derived from at least one diamine. Generally, any known diamine known in the art may be used. Preferably, the diamines used are aliphatic and/or cycloaliphatic diamines. In a preferred embodiment, the at least one first semi-crystalline polyamide comprises only diamine repeating units derived from aliphatic diamines. In a further preferred embodiment, the at least one second semi-crystalline polyamide comprises diamine repeating units derived from aliphatic and/or cycloaliphatic diamines. In a particular preferred embodiment, the at least one first semi-crystalline polyamide and the at least one second semi-crystalline polyamide comprise only diamine repeating units which are derived from aliphatic diamines Suitable aliphatic diamines comprise all aliphatic diamines commonly used in the preparation of polyamides. Preferred aliphatic dicarboxylic acids include dicarboxylic acids of the general formula (III):

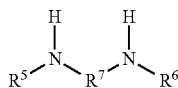

(III)

wherein
$R^5$ and $R^6$ each independently represent a hydrogen atom or an aliphatic, saturated or unsaturated, linear or branched hydrocarbon group having 1 to 5, preferably 1 to 3, carbon atoms; and
$R^7$ represents an aliphatic, saturated or unsaturated, linear or branched hydrocarbon group having 1 to 20, preferably, 2 to 10, and in particular 3 to 6 carbon atoms.

In a preferred embodiment, $R^5$ and $R^6$ represent a hydrogen atom.

Preferred aliphatic diamines include hexamethylene diamine and/or the 5-methyl pentamethylene diamine. In a particular preferred embodiment hexamethylene diamine is used.

Suitable cycloaliphatic diamines comprise all cycloaliphatic diamines commonly used in the preparation of polyamides. Preferred aromatic diamines include diamines of the general formula (IV):

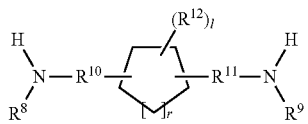

(IV)

wherein
$R^8$ and $R^9$ each independently represent a hydrogen atom or an aliphatic, saturated or unsaturated, linear or branched hydrocarbon group having 1 to 5, preferably 1 to 3, carbon atoms;
$R^{10}$ and $R^{11}$ each independently represent a single bond or an aliphatic, saturated or unsaturated, linear, branched or cyclic hydrocarbon group having 1 to 20, preferably, 1 to 10, and in particular 1 to 6 carbon atoms;
$R^{12}$ represents a hydrogen atom, a hydroxyl group or an aliphatic hydrocarbon group having 1 to 3 carbon atoms; and
r represents an integer from 0 to 3; and
l is r+3.

In one embodiment, $R^{10}$ and $R^{11}$ each represent a single bond and the amine group is directly bonded to the aromatic ring. In an alternative one embodiment, $R^{10}$ and $R^{11}$ each represent an aliphatic, saturated, linear, hydrocarbon group having 1 to 20, preferably, 1 to 10, and in particular 1 to 6 carbon atoms.

In a preferred embodiment, $R^8$ and $R^9$ each represent a hydrogen atom.

In a further preferred embodiment, $R^{12}$ represents a hydrogen atom or a hydroxyl group.

$R^{10}$ and $R^{11}$ may be positions in ortho-, meta-, or para-position to each other at the cycloaliphatic ring. It is particular preferred that the groups $R^{10}$ and $R^{11}$ are in meta- or para-position.

In a further preferred embodiment r is 1.

Preferred cycloaliphatic diamines include isophoron diamine (3-aminomethyl-3,5,5-trimethylcyclohexylamine), 1,2-diamine cyclohexane, and 1,3-diamino cyclohexane.

Furthermore, the at least one first semi-crystalline polyamide and the at least one second semi-crystalline polyamide may comprise repeating units derived from amino acids and/or lactams. Suitable monomers are known in the art. Particular preferred amino carboxylic acids include ε-aminocaproic acid. Particular preferred lactams include ε-caprolactam. The amount of repeating units derived from amino acids and/or lactams within the at least one first semi-crystalline polyamide and the at least one second semi-crystalline polyamide may be within the range of from 0 to 30 mol-% of the entire moles of repeating units within the at least one first semi-crystalline polyamide and/or the at least one second semi-crystalline polyamide, respectively.

The at least one first semi-crystalline polyamide and the at least one second semi-crystalline polyamide can be obtained by any know polymerization method, in particular through melt polycondensation reaction of mixtures of at least one aromatic dicarboxylic acid and at least one aliphatic dicarboxylic acid in the determined molar amounts and at least one diamine which is used in stoichiometric amounts with respect to the dicarboxylic acids. Alternatively, a salt of at least one of the dicarboxylic acids and at least a part of the diamine can be prepared in a first step which is then fed into a polycondensation equipment to obtain the respective polyamides, according one of technologies well known in the art (e.g. as described in Nylon Plastics Handbook, edited by Melvin Kohan, Hanser Verlag, 1995). Amino acids and/or lactams can be incorporated in the same processes.

Particularly preferred examples of the one first semi-crystalline polyamide include polyamide 66/6T, polyamide 6/6T, polyamide 66/6I, and polyamide 66/6T/6I, the most preferred example being polyamide 66/6T.

Particularly preferred examples of the one second semi-crystalline polyamide include polyamide 6T/66, polyamide 6T/6, polyamide 6I/66, and polyamide 6T/6I/66, the most preferred example being polyamide 6T/66.

In one preferred embodiment of the invention, the first semi-crystalline polyamide is polyamide 66/6T and the second semi-crystalline polyamide is polyamide 6T/66.

Note that the homopolymers and copolymers are identified herein by their respective repeating units. For copolymers disclosed herein, the repeating units are listed in decreasing order of mole % repeating units present in the copolymer. In the art the term "6" when used in combination with a repeating unit derived from a diacid such as terephthalic acid (commonly abbreviated as T) or isophthalic acid (commonly abbreviated as I), for instance 6T, the "6" refers to repeating units derived from hexamethylene diamine (HMD). In repeating units comprising a diamine and diacid, the diamine is designated first. Furthermore, when "6" is used in combination with a diamine, for instance 66, the first "6" refers to the repeating units derived from the diamine HMD, and the second "6" refers to repeating units derived from the diacid adipic acid. Likewise, repeating units derived from amino acids or lactams are designated as single numbers designating the number of carbon atoms.

Thus, polyamide 66/6T and polyamide 6T/66 comprise the same repeating units but differ in that polyamide 66/6T comprises a higher amount of repeating units derived from adipic acid (6) compared to repeating units derived from terephthalic acid (T) whereas polyamide 6T/66 comprises a higher amount of repeating units derived from terephthalic acid (T) compared to repeating units derived from adipic acid (6).

The polyamide composition further comprises at least one glass fibre. The at least one glass fibre is preferably present in the polyamide composition in an amount of from 10 to 70 wt.-%, based on the total weight of the polyamide composition, more preferably in an amount of from 20 to 60 wt.-%, in particular in an amount of from 30 to 55 wt.-%.

It has been found out that the polyamide composition of the present invention should comprise not more than 70 wt.-%, preferably not more than 60 wt.-% of glass fibres, based on the total weight of the polyamide composition, in order to ensure that the polyamide composition is properly extrudable and injectable.

The nature of glasses constituting the glass fibres of the polyamide composition of the present invention is not particularly limited and can include E glass, boron free glass fibres, T glass, NE glass, C glass, S glass, S2 glass and R glass, and the like. Glass fibres may contain sizing agents on their surface in order to guarantee their cohesion when in continuous and chopped strand forms, and particularly to provide adhesion at the interface with the polyamide matrix. Particularly preferred are E glass fibres and boron free glass fibres.

Glass fibres can be comprised in the polyamide composition in form of continuous roving bundles or in form of chopped strands. Once glass fibres are mixed with the at least one first and second polyamide in a mixing devices, e.g. an extruder, the glass fibres break into shorter fibrils with a given length distribution determined by the type and amount of glass fibres, by the extruder screw profile and by the processing conditions.

In one embodiment of the invention, the at least one glass fibre is introduced to the polyamide composition in form of at least one chopped glass fibre, in particular a chopped glass fibre having an initial number-average fibre length of 0.1 to 10 mm, in particular 0.5 to 5 mm. The number-average fibre length of the at least one glass fibre in the final polyamide composition (i.e. after compounding process) is typically in the range of from 200 to 1000 µm.

The at least one glass fibre may comprise at least one glass fibre having a substantially circular cross section (herein also further referred to as circular glass fibre) and/or at least one glass fibre having a substantially non-circular cross section (herein also further referred to as flat glass fibre).

In one embodiment of the invention, the polyamide composition comprises at least one circular glass fibre.

Glass fibres for being used in the polyamide composition of the present invention are typically glass fibres having a circular cross-sectional area. They are typically defined by their fibre diameter (D), and by their initial fibre length (L). Circular glass fibres according to the present invention preferably have an average fibre diameter (D) ranging from 6.5 to 17 µm, more preferably ranging from 7 to 13 µm. Typically, circular glass fibres having a diameter of 10 µm are used. The initial fibre length (L) corresponds to the length of the chopped strands prior to compounding. Usually, the initial fibre length (L) ranges from 2 to 10 mm, preferably from 3 to 6 mm. Typically, chopped strands fibre length is 3 or 4.5 mm according to suppliers.

In one embodiment of the invention, the polyamide composition comprises at least one (non-circular) flat glass fibre.

Flat glass fibres suitable for being used in the polyamide composition of the present invention may have any non-circular cross section such as an elliptical section, oblong-circular section, rectangle section, a section in which half rounds are connected to both short sides of a rectangle, and cocoon section.

The flatness ratio (=length of main cross-sectional axis/length of the secondary cross-sectional axis) of said non-circular cross section of the flat glass fibres is advantageously from 1:1.5 to 1:5, preferably from 1:2 to 1:4.

Furthermore, the flat glass fibres of the present invention preferably have a length of the main cross-sectional axis in a range of 6 to 40 µm, in particular of 10 to 30 µm, more preferably of 16 to 28 µm. The length of the subsidiary cross sectional axis is preferably in the range of 1 to 20 µm, in particle in the range of 2 to 10 µm, more preferably of 3 to 8 µm.

Additionally, the polyamide composition of the present invention may further comprise at least one further additive. The at least one further additive may be present in an amount of 0 to 5 wt.-%, preferably 0.01 to 2 wt.-%, in particular 0.01 to 1 wt.-% based on the total weight of the polyamide composition.

The term "additive" as used herein refers to every compound suitable for the polyamide composition according to the invention, but does not refer to polyamide resins. In particular the additives which may be advantageously used in the polyamide composition include thermal stabilizers, light stabilizers, lubricants, nucleating agents, colorants such as pigments and/or dyes, chain extenders, impact modifiers, flame retardants, catalysts, antioxidants, plasticizers, nucleating agents, antistatic agents, and any combinations thereof.

In a preferred embodiment, the polyamide composition comprises at least one thermal stabilizer. Preferably, the thermal stabilizer is present in the polyamide composition in an amount of from 0.01 to 1.0 wt.-%, in particular from 0.05 to 0.5 wt.-%, based on the total weight of the polyamide composition.

In the present invention, the term "thermal stabilizer" is intended to denote, in particular, a material added to a polymer composition to improve thermal stability by preventing thermo-oxidative degradation during processing.

In the present invention, at least one thermal stabilizer is preferably selected from the group consisting of hindered phenol compounds, hindered amine compounds, phosphorous compounds, copper-containing compounds, and combinations thereof, preferably a combination of a hindered phenol compound and a phosphorous compound, more preferably copper-containing compounds.

The term "hindered phenol compound" is used according to its customary meaning in this field and generally intended to denote derivatives of ortho-substituted phenol, especially (but not limited to) di-tert-butyl-1-phenol derivatives, well known in the art.

The term "hindered amine compound" is used according to its customary meaning in this field and generally intended to denote derivatives of 2,2,6,6-tetramethyl piperidine well known in the art (see for example: Plastics Additives Handbook, 5th ed., Hanser, 2001). The hindered amine compound of the composition according to the present invention may either be of low or high molecular weight.

The hindered amine compounds of low molecular weight have typically a molecular weight of at most 900, preferably at most 800, more preferably of at most 700, still more preferably at most 600, and most preferably of at most 500 g/mol.

The hindered amine compounds of high molecular weight are typically polymeric and have typically a molecular weight of at least 1000, preferably at least 1100, more preferably of at least 1200, still more preferably at least 1300, and most preferably of at least 1400 g/mol.

In the present invention, at least one heat stabilizer may be at least one phosphorous compound selected from the group consisting of an alkali or alkali earth metal hypophosphites, phosphite esters, phosphonites and mixtures thereof sodium and calcium hypophosphites are preferred alkali or alkali earth metal hypophosphites.

A phosphite ester may be represented by the formula $P(OR)_3$, while a phosphonite may be represented by the formula $P(OR)_2R$, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

The copper-containing stabilizer, which can be used for a polyamide composition according to the present invention, is further characterized as comprising a copper compound soluble in the polyamide and an alkali metal halide. More particularly, the copper-containing stabilizer consists essentially of a copper compound selected from the group consisting of copper (I) oxide, copper (II) oxide, copper (I) salt, for example cuprous acetate, cuprous stearate, a cuprous organic complex compound such as copper acetylacetonate, a cuprous halide or the like; and an alkali metal halide. According to certain preferred embodiments, the copper-containing stabilizer will consist essentially of a copper halide selected from copper iodide and copper bromide and an alkali metal halide or earth alkali metal halide selected from the group consisting of iodides and bromides of Li, Na, K and Mg. Stabilizing formulations comprising copper (I) iodide and potassium iodide are well known and commercially available for use in stabilizing polyamides.

In a particular preferred embodiment of the present invention, the polyamide composition comprises at least one thermal stabilizer comprising at least one copper salt.

A particularly preferred combination is the combination of CuI and KI. Another very advantageous combination is the mixture of $Cu_2O$ and KBr.

In the present invention, the weight ratio of copper (I) halide to alkali metal halide is in the range of from about 1:2.5 to about 1:20, preferably from about 1:3 to about 1:10, more preferably about 1:5 to 1:6.

In a preferred embodiment of the present invention the polyamide composition comprises at least one copper salt in an amount of 0.01 to 0.10 wt.-%, preferably 0.01 to 0.05 wt.-%, based on the total weight of the polyamide composition.

In a further aspect this embodiment of the present invention the polyamide composition comprises at least one potassium salt in an amount of 0.05 to 0.50 wt.-%, preferably 0.1 to 0.3 wt.-%, based on the total weight of the polyamide composition.

Thus, in one aspect of the present invention, the polyamide comprises at least one copper salt, preferably CuI, in an amount of 0.01 to 0.10 wt.-%, preferably 0.0. to 0.05 wt.-%, based on the total weight of the polyamide composition, in combination with at least one potassium salt, preferably KI, in an amount of 0.05 to 0.50 wt.-%, preferably 0.1 to 0.3 wt.-%, based on the total weight of the polyamide composition, as thermal stabilizer.

The above mentioned additives other than thermal stabilizers, i.e. light stabilizers, lubricants, nucleating agents, colorants such as pigments and/or dyes, chain extenders, impact modifiers, flame retardants, catalysts, antioxidants, plasticizers, nucleating agents, antistatic agents, and any combinations thereof, may typically be present in the polyamide composition according to the invention in amount of 0.01 to 4.0 wt.-%, more preferably in an amount of 0.05 to 3.0 wt.-% and in particular in an amount of from 0.1 to 2.0 wt.-%, based on the total weight of the polyamide composition.

Examples for suitable light stabilizers, lubricants, nucleating agents, colorants such as pigments and/or dyes, chain extenders, impact modifiers, flame retardants, catalysts, antioxidants, plasticizers, nucleating agents, are:

Preferred light stabilizers include, among others, hindered amine light stabilizers (HALS), carbon black, benzotriazoles, hindered phenols, (inorganic) phosphites, ZnO, and combinations thereof.

Preferred lubricants include, among others, long chain fatty acids and their salts (such as stearic acid, Na stearate, Mg stearate, Al stearate, Ca stearate), long chain fatty acid amides such as ethylenebis-stearamide, montanic waxes, behenic waxes, or paraffines and oxidized paraffines, or combinations thereof.

Preferred nucleating agents include, among others, talc, polyamide 2.2, (inorganic) stearates, phenylphosphinic acid salts, etc., and combinations thereof.

Preferred colorants or dyes include, among others, carbon black, nigrosine chloridrate and nigrosine base.

Preferred chain extenders include, among others, diepoxy resins, di-anhydrides, bisoxazolines, styrene/maleic anhydride copolymers, ethylene/maleic anhydride copolymers, ethylene/(meth)acrylate/(glycidyl(meth)acrylate copolymers etc., and combinations thereof Preferred impact modifiers include among others, compounds such as grafted polyolefins like maleic anhydride grafted ethylene/propylene copolymers (EP-g-MA), maleic anhydride grafted ethylene/propylene/diene copolymers (EPDM-g-MA), maleic anhydride grafted styrene/ethylene/ 1-butene/styrene block copolymers (SEBS-g-MA), and others polyolefin copolymers such acrylic or methacrylic acid or acid salts.

Preferred flame retardants include, among others, compounds such as aluminum phosphinates, melamine polyphosphate (MPP), organophosphorus compounds, melamine cyanurate, red phosphorus, halogenated polystyrene, etc., and combinations thereof.

Preferred catalysts include, among others, compounds such as $H_3PO_4$, $H_3PO_3$, $NaHPO_2$, etc., and combinations thereof.

Preferred antioxidants include, among others, compounds such as hindered phenols, semi-aromatic amines or amides, organic phosphites, $NaHPO_2$ etc., and combinations thereof.

Preferred plasticizers include compounds such as sulfonamides, for instance the N-butyl benzene sulfonamide (e.g. BBSA)

In a preferred embodiment, the present invention relates to a polyamide composition comprising (or consisting of):
(a) 20 to 60 wt.-%, preferably 22 to 50 wt.-% in particular 25 to 40 wt.-% based on the total weight of the polyamide composition, of at least one first semi-crystalline polyamide comprising repeating units derived from two or more diacids and one or more diamine(s), containing:

(i) ≥20 to <40 mol.-%, preferably ≥25 to ≤35 mol.-%, of at least one aromatic diacid, based on the total amount of moles of diacids present in the first polyamide, (ii) >60 to ≤80 mol.-%, preferably ≥65 to ≤75 mol.-%, of at least one aliphatic diacid, based on the total amount of moles of diacids present in the first polyamide, (b) 5 to 30 wt.-%, preferably 10 to 25 wt.-%, in particular 10 to 20 wt.-%, based on the total weight of the polyamide composition, of at least one second semi-crystalline polyamide comprising repeating units derived from two or more diacids and one or more diamine(s), containing:

(i) ≥40 to ≤90 mol.-%, preferably ≥50 to ≤80 mol.-%, of at least one aromatic diacid, based on the total amount of moles of diacids present in the second polyamide, (ii) ≥10 to ≤60 mol.-%, preferably ≥20 to ≤50 mol.-%, of at least one aliphatic diacid, based on the total amount of moles of diacids present in the second polyamide, (c) 10 to 70 wt.-%, preferably 20 to 60 wt.-%, in particular 30 to 55 wt.-%, based on the total weight of the polyamide composition, of at least one glass fibre, and (d) 0 to 5 wt.-%, preferably 0.01 to 2 wt.-%, in particular 0.01 to 1 wt.-% based on the total weight of the polyamide composition, of at least one further additive.

In another aspect of the invention, the present invention relates to a polyamide composition comprising (or consisting of):

(a) at least one first semi-crystalline polyamide made of two or more diacids and one or more diamine(s), containing:

(i) ≥20 to <40 mol.-% of at least one aromatic diacid, based on the total amount of moles of diacid(s) present in the first polyamide, (ii) >60 to ≤80 mol.-% of at least one aliphatic diacid, based on the total amount of moles of diacid(s) present in the first polyamide, (b) at least one second semi-crystalline polyamide made of two or more diacids and one or more diamine(s), containing:

(i) ≥40 to ≤90 mol.-% of at least one aromatic diacid, based on the total amount of moles of diacid(s) present in the second polyamide, (ii) ≥10 to ≤60 mol.-% of at least one aliphatic diacid, based on the total amount of moles of diacid(s) present in the second polyamide, (c) at least one glass fibre, and (d) optionally at least one further additive.

In a further preferred embodiment of this aspect, the present invention relates to a polyamide composition comprising (or consisting of):

(a) 20 to 60 wt.-%, preferably 22 to 50 wt.-% in particular 25 to 40 wt.-% based on the total weight of the polyamide composition, of at least one first semi-crystalline polyamide made of two or more diacids and one or more diamine(s), containing:

(i) ≥20 to <40 mol.-%, preferably ≥25 to ≤35 mol.-%, of at least one aromatic diacid, based on the total amount of moles of diacids present in the first polyamide, (ii) >60 to ≤80 mol.-%, preferably ≥65 to ≤75 mol.-%, of at least one aliphatic diacid, based on the total amount of moles of diacids present in the first polyamide, (b) 5 to 30 wt.-%, preferably 10 to 25 wt.-%, in particular 10 to 20 wt.-%, based on the total weight of the polyamide composition, of at least one second semi-crystalline polyamide made of two or more diacids and one or more diamine(s), containing:

(i) ≥40 to ≤90 mol.-%, preferably ≥50 to ≤80 mol.-%, of at least one aromatic diacid, based on the total amount of moles of diacids present in the second polyamide, (ii) ≥10 to ≤60 mol.-%, preferably ≥20 to ≤50 mol.-%, of at least one aliphatic diacid, based on the total amount of moles of diacids present in the second polyamide, (c) 10 to 70 wt.-%, preferably 20 to 60 wt.-%, in particular 30 to 55 wt.-%, based on the total weight of the polyamide composition, of at least one glass fibre, and (d) 0 to 5 wt.-%, preferably 0.01 to 2 wt.-%, in particular 0.01 to 1 wt.-% based on the total weight of the polyamide composition, of at least one further additive.

The polyamide composition as described herein comprising an amount of 50 wt.-% of at least one glass fibre, based on the total weight of the polyamide composition, preferably has a heat distortion temperature, determined under loading of 1.8 MPa according to ASTM D648/DIN EN ISO 75 standard, of ≥260° C., preferably ≥265° C. Further preferably, the heat distortion temperature, determined under loading of 1.8 MPa according to ASTM D648/DIN EN ISO 75 standard, is ≤275° C., more preferably ≤270° C.

In a further aspect of the present invention, the polyamide composition is characterized by having a flexural modulus of more than 13,000 MPa, determined according to DIN EN DIN EN ISO 178 at 23° C.

In a further aspect of the present invention, the polyamide composition is characterized by having and melt viscosity lower than 100 Pa·s (measured by capillary rheometry under shear rate of 1/2500 s at 310° C. according to ISO 11443).

A further advantageous property of the polyamide composition according to the invention is the low water absorption. In in particular, the polyamide composition exhibits a water absorption of less than 0.7 wt.-%, in particular less than 0.6 wt.-%, determined according to DIN EN ISO 62. This aspect is important for injection processing, where a high water content increases the probability of polymer degradation during the processing step and therefore requires a time consuming dry step before injection processing.

Furthermore, the mechanical properties of the polyamide compositions according to the invention are superior and substantially not negatively affected by the improved melt flowability.

The polyamide composition of the present invention can be produced by any known method for the production of fibre-reinforced polyamide compositions. Without being limited thereto, typically granulates are produce, in particular by extrusion processes in which the glass fibres and optional additives are homogeneously mixed with the polymer melt and subsequently is cooled and cut.

The polyamide granulate obtained in this way, which has preferably a granulate length of 1 to 10 mm, in particular of 2 to 5 mm or more preferably of 2 to 4 mm, can be further processed with normal processing methods (such as e.g. extrusion, injection and/or blow molding) to form molded articles, particular good properties of the molded articles being achieved with gentle processing methods. Preferably the molded articles are produced by injection molding. In this context, gentle means above all that excessive fibre breakage and a great reduction in fibre length associated therewith is avoided. In injection molding, this means that screws with large diameter should be used.

The polyamide composition of the present invention may advantageously be used in applications requiring high dimensional stability at elevated temperatures.

In particular, the polyamide composition of the present invention is advantageously used for applications in contact with hot water requiring high dimensional stability at elevated temperatures. Examples of these application include electrical shower housings, more precisely, the plastic support for piece of metal, known as a heating element.

According to the invention, the polyamide composition is used to produce molded articles preferably by injection molding processes, extrusion processes or blow molding processes, in particular by injection molding processes. The polyamide composition is characterized in that it exhibits improved processing properties in these molding processes, in particular high flowability (i.e. high melt flow rate, low melt viscosity). As a result, the cycle time for the molding process, in particular injection molding process is significantly reduced. At the same time lower processing temperatures may be used.

The present invention also relates to a molded article, comprising at least one polyamide composition according to the present invention.

Other details or advantages of the present invention will become more clearly apparent through the examples given below. The present invention will be elucidated by the following examples, which are intended to demonstrate, but not to restrict, the invention.

Examples

Compounds

The following materials were used in the preparation of examples:

PA66/6T Stabamid 26 UD1, a PA66/6T partially aromatic polyamide produced by Solvay Performance Polyamides. The PA66/6T is based on hexamethylenediamine, terephthalic acid (T) and adipic acid. The molar relative percentage between terephthalic acid and adipic acid in the polymer is 35:65 mol/mol. The PA66/6T has a melting temperature of 285° C., a crystallization temperature of 245° C., and a melt viscosity measured under shear rate of 1/2500 s at 290° C. of 60 Pa·s.

PA6T/66 Amodel A-6000, a 6T/66 polyphthalamide (PPA) produced by Solvay Specialty Polymers. The PA6T/66 is based on hexamethylenediamine, terephthalic acid (T) and adipic acid. The molar relative percentage between terephthalic acid and adipic acid in the chain is 55:45 mol/mol. The PA6T/66 has a melting point of 310° C., a crystallization temperature of 260° C., and a melt viscosity measured under shear rate of 1/2500 s at 325° C. of 90 Pa·s.

PA66 Stabamid 38 AP, an aliphatic polyamide 6.6 available from Solvay Performance Polyamides, having a melting temperature of 258° C., a crystallization temperature of 217° C.

Glass Fibre ECS03T 292HR availabe from Nippon Electric Glass, having a circular diameter ranging from 7 to 13 μm.

Thermal stabilizers copper iodide (CuI) available from INCASA S/A potassium iodide (KI) available from Microservice Polyamide Compositions Polyamide compositions having the compositions defined in Table 1 were prepared as Examples and Comparative Examples. All amounts are given in wt.-%.

TABLE 1

Chemical composition (wt.-%) of Comparatives 1, 2, 3 and Examples 1 and 2.

| Ingredients | Comp.-Ex. 1 | Comp.-Ex. 2 | Comp.-Ex. 3 | Ex. 1 | Ex. 2 |
|---|---|---|---|---|---|
| PA66/6T | 49.55 | 0.00 | 29.55 | 34.59 | 29.55 |
| PA6T/66 | 0.00 | 49.55 | 0 | 15.00 | 20.00 |
| PA66 | 0.00 | 0.00 | 20.00 | 0.00 | 0.00 |
| Glass Fibre | 50.00 | 50.00 | 50.00 | 50.00 | 50.00 |
| CuI | 0.03 | 0.03 | 0.03 | 0.03 | 0.03 |
| KI | 0.17 | 0.17 | 0.17 | 0.17 | 0.17 |

The Comparative Examples 1, 2, 3 and Examples 1 and 2 were processed by melt blending in a twin screw extruder ZSK-26 Mega Compounder, with screw speed of 250 rpm and feed rate of 20 kg/h. The barrel temperature profile was 280-310° C. The glass fibre was added to the melt through a screw side feeder.

After the extrusion, the test specimen of Comparative Examples 1, 2, 3 and the Examples 1 and 2 were injected according to the parameter described in Table 2.

TABLE 2

Injection parameters of Comparatives 1, 2 and 3, and Examples 1 and 2.

| Properties | Unit | Comp.-Ex. 1 | Comp.-Ex. 2* | Comp.-Ex. 3 | Ex. 1 | Ex. 2 |
|---|---|---|---|---|---|---|
| Rear Temperature | ° C. | 295 | 320 | 295 | 295 | 295 |
| Middle Temperature | ° C. | 300 | 325 | 300 | 300 | 300 |
| Front Temperature | ° C. | 310 | 330 | 310 | 310 | 310 |
| Nozzle Temperature | ° C. | 310 | 330 | 310 | 310 | 310 |
| Processing (Melt) Temperature | ° C. | 320 | 330 | 320 | 320 | 320 |
| Mold Temperature | ° C. | 110 | 110 | 110 | 110 | 110 |

*Due to the high melting temperature of base resin of Comparative 2, it was necessary and recommended to use a higher processing temperature profile than the other comparatives and examples; otherwise this sample could have shown lower properties than those obtained in recommended processing parameter.

Testing Methods

The properties of the polyamide compositions according to Examples 1 and 2 as well as according to Comparative Examples 1, 2 and 3, were evaluated by using the following testing methods:

Flexural strength was determined at 23° C. according to DIN EN ISO 178.

Charpy unnotched impact resistance was determined at 23° C. according to DIN EN ISO 179 1 eU.

Charpy notched impact resistance was determined at 23° C. according to DIN EN ISO 179 1 eA.

Molding shrinkage was determined according to ISO 2577 (2.0 mm).

Heat distortion temperature (HDT) was determined according to DIN EN ISO 75 under a loading of 1.80 MPa.

Melting temperatures were determined using differential scanning calorimetry (DSC) according to DIN EN ISO 11357.

Glow Wire Flammability Testing (GWFI) was carried out in accordance to IEC 60695-2-12.

Flammability was tested according to "Tests for Flammability of Plastic Materials for Parts in Devices and Appliances" issued by Underwriters Laboratories as UL 94.

Water absorption was determined according to DIN EN ISO 62.

Melt viscosity at high shear rate was determined by capillary rheometry according to ISO 11443 under shear rate of 1/2500 sat 310° C.

Spiral flow was determined according to the following procedure. A DEMAG SUMITOMO SYSTEC 60-430 injection molding device was set with the following barrel temperature profile: 300° C. (Zone 1), 305° C. (zone 2); 315° C. (zone 3) 320° C. (nozzle). Mould temperature was 110° C. Injection pressure applied was 700 bar. Such conditions were used for the spiral injection of all examples.

Shrinkage behavior was determined according to ISO 2577 over injected plates with the dimensions of 60/60/2 (length/width/thickness) millimeters.

Test Results

The mechanical properties and heat distortion temperature of Comparative Examples 1, 2 and 3, and Examples 1 and 2 are shown in the Table 3. It can be seen that the mechanical properties as well as heat distortion temperature of Examples 1 and 2 are superior compared to Comparative Examples 1, 2 and 3.

In comparison to Comparative Example 2, it was not expected that a higher heat distortion temperature and higher flexural modulus could be achieved by Example 2. The combination of the first semi-crystalline polyamide and the second semi-crystalline polyamide is believed to result in a synergistic effect which provides this unique combination of advantageous properties.

TABLE 3

Mechanical properties and heat distortion temperature (HDT) of Comparative Examples 1, 2, 3 and Examples 1 and 2.

| Properties | Unit | Comp 1 | Comp 2 | Comp 3 | Ex 1 | Ex 2 |
|---|---|---|---|---|---|---|
| Stress at break | MPa | 300 | 330 | 255 | 340 | 360 |
| Strain at break | % | 2.0 | 3.5 | 2.7 | 3.1 | 3.3 |
| Flexural Modulus | MPa | 13,400 | 14,200 | 13,000 | 13,900 | 15,000 |
| Notched Charpy Impact 1eA | kJ/m$^2$ | 10.5 | 11.6 | 10.9 | 14.0 | 13.0 |
| Unnotched Charpy Impact 1eU | kJ/m$^2$ | 91.0 | 90.0 | 105.0 | 100.0 | 93.0 |
| HDT 1.8 MPa | ° C. | 255 | 256 | 250 | 265 | 270 |

Thermal and rheological properties of Comparative Examples 1, 2 and 3, and Example 1 and 2 are summarized in the Table 4. It has to be noted that the cooling times for Examples 1 and 2 were shorter than those for Comparative Examples 1, 2 and 3. This behavior of the polyamide composition according to the invention allows a significant reduction of cycle time during the preparation of molded articles from the polyamide compositions disclosed herein.

Another advantage of the polyamide composition according to the invention is its high flow ability. According to the present invention it is possible to achieve a higher HDT performance than Comparative Example 2 but similar flowability as Comparative Example 1. These phenomena can be observed in the test results of spiral flow and melting viscosity. The blend of two different aromatic polyamides according to the present invention is able to meet the advantages of each aromatic polymers and overcome the disadvantages of each ones.

TABLE 4

Thermal and rheological properties of Comparative Examples 1, 2, 3 and Examples 1 and 2

| Properties | Unit | Comp 1 | Comp 2 | Comp 3 | Ex 1 | Ex 2 |
|---|---|---|---|---|---|---|
| Melting temperature | ° C. | 290 | 310 | 285 | 293 | 296 |
| Spiral flow | mm | 1082 | 780 | 1100 | 1000 | 1005 |
| Melting viscosity at 310° C. under 1/2500 s | Pa · s | 100 | 170 | 87 | 90 | 96 |
| Cooling time | s | 15 | 25 | 10 | 8 | 8 |

Flame retarding properties of Comparative Examples 1, 2, 3 and Examples 1 and 2 are shown in Table 5. Examples 1 and 2 achieved higher Glow-Wire Flammability Temperatures than Comparative Examples 1, 2 and 3. Similar observations were made for Flammability Rating according to UL-94 (rate V-2 is better than rate HB). In particular, Examples 1 and 2 showed improved flame retardancy in the UL-94 test than Comparative Examples 1 and 2.

TABLE 5

Flame retardant properties of Comparative Examples 1, 2, 3 and Examples 1 and 2.

| Properties | Unit | Comp 1 | Comp 2 | Comp 3 | Ex 1 | Ex 2 |
|---|---|---|---|---|---|---|
| Glow-wire flammability index at 1.6 mm | ° C. | 700 | 700 | 700 | 750 | 800 |
| Glow-wire flammability index at 3.02 mm | ° C. | 800 | 800 | 800 | 850 | 900 |
| Flammability 1.6 mm | Rating | HB | HB | V-2 | V-2 | V-2 |
| Flammability 3.02 mm | Rating | HB | HB | V-2 | V-2 | V-2 |

Moreover, water absorption properties of the Comparative Examples and Examples were tested. It was observed that Examples 1 and 2 show lower water absorption than Comparative Examples 1, 2 and 3, as can be seen in Table 6. Besides of the low water absorption, polyamide compositions according to the present invention show lower shrinkage behavior compared to the Comparatives Examples 1, 2 and 3 (cf. Table 6).

TABLE 6

Physical properties of Comparative Examples 1, 2, 3 and Examples 1 and 2.

| Properties | Unit | Comp 1 | Comp 2 | Comp 3 | Ex 1 | Ex 2 |
|---|---|---|---|---|---|---|
| Water | % | 0.77 | 0.78 | 0.90 | 0.55 | 0.53 |
| Shrinkage | % | 0.21 | 0.19 | 0.41 | 0.15 | 0.18 |
| Shrinkage | % | 0.78 | 0.79 | 1.22 | 0.40 | 0.28 |

The invention claimed is:

1. A polyamide composition comprising:
   (a) at least one first semi-crystalline polyamide comprising repeating units derived from two or more diacids and one or more diamine(s), containing:
      (i) ≥20 to <40 mol-% of at least one aromatic diacid, based on a total amount of moles of diacid(s) present in the first polyamide,
      (ii) >60 to ≤80 mol.-% of at least one aliphatic diacid, based on the total amount of moles of diacid(s) present in the first polyamide, wherein the at least one first semi-crystalline polyamide has a melt viscosity between 30 Pa·s and 80 Pa·s measured under shear rate of 1/2500 s at 290° C., according to ISO 11443,
   (b) at least one second semi-crystalline polyamide comprising repeating units derived from two or more diacids and one or more diamine(s), containing:
      (i) ≥40 to ≤90 mol.-% of at least one aromatic diacid, based on a total amount of moles of diacid(s) present in the second polyamide,
      (ii) 10 to 60 mol.-% of at least one aliphatic diacid, based on the total amount of moles of diacid(s) present in the second polyamide, wherein the at least one second semi-crystalline polyamide has a melting temperature of more than 290° C.,
   the second semi-crystalline polyamide having a higher heat distortion temperature than the first semi-crystalline polyamide,
   (c) from 10 to 70 wt.-%, based on a total weight of the polyamide composition, of at least one glass fibre having a circular cross-sectional area, and
   (d) optionally at least one further additive.

2. The polyamide composition according to claim 1, wherein the at least one first semi crystalline polyamide has a melting temperature between 280° C. and 300° C.

3. The polyamide composition according to claim 1, wherein the at least one first semi-crystalline polyamide has a crystallization temperature (Tc1) between 245° C. and 260° C.

4. The polyamide composition according to claim 1, wherein the at least one first semi-crystalline polyamide has a melt viscosity between 55 Pa·s and 65 Pa·s.

5. The polyamide composition according to claim 1, wherein the at least one second semi-crystalline polyamide has a melting temperature of between 295° C. and 315° C.

6. The polyamide composition according to claim 1, wherein the at least one second semi-crystalline polyamide has a crystallization temperature (Tc2) between 250° C. and 270° C.

7. The polyamide composition according to claim 1, wherein the at least one second semi-crystalline polyamide has a melt viscosity between 80 Pa's and 100 Pa's, measured under shear rate of 1/2500 s and 325° C., according to ISO 11443.

8. The polyamide composition according to claim 1, wherein the polyamide composition comprises from 10 to 70 wt.-% of glass fibres, based on a total weight of the polyamide composition.

9. The polyamide composition according to claim 1, wherein the polyamide composition comprises from 0.01 to 1.0 wt.-% of at least one thermal stabilizer.

10. The polyamide composition according to claim 1, wherein the polyamide composition comprises an amount of 50 wt.-% of at least one glass fibre, based on a total weight of the polyamide composition, and has a heat distortion temperature, determined under loading of 1.8 MPa according to DIN EN ISO 75 standard, of ≥260° C.

11. The polyamide composition according to claim 1, wherein the at least one thermal stabilizer comprises copper salts or copper oxides and halogen salts of alkaline or alkaline earth metals.

12. The polyamide composition according to claim 11, wherein the thermal stabilizer comprises at least one copper salt in an amount of 0.01 to 0.10 wt.-%, based on a total weight of the polyamide composition.

13. A molded article, comprising at least one polyamide composition according to claim 1.

14. A process for preparing a molded article according to claim 13, the process comprising an injection molding process, extrusion process or blow molding process.

15. A method of using a polyamide composition according to claim 1 or a molded article comprising at least one polyamide composition according to claim 1, the method comprising using the polyamide composition or molded article in applications requiring high dimensional stability at elevated temperatures.

16. The polyamide composition according to claim 1, wherein the at least one first semicrystalline polyamide has a melting temperature between 285° C. and 295° C.

17. The polyamide composition according to claim 1, wherein the at least one first semi-crystalline polyamide has a crystallization temperature (Tc1) between 245° C. and 255° C.

18. The polyamide composition according to claim 1, wherein the at least one second semi-crystalline polyamide has a crystallization temperature (Tc2) between 255° C. and 265° C.

19. The polyamide composition according to claim 1, wherein the at least one second semi-crystalline polyamide has a melt viscosity between 85 Pa·s and 95 Pa·s, measured under shear rate of 1/2500 s and 325° C., according to ISO 11443.

* * * * *